US006533184B1

(12) United States Patent
Kim

(10) Patent No.: US 6,533,184 B1
(45) Date of Patent: Mar. 18, 2003

(54) COMFORT STEERING WHEEL

(76) Inventor: Kiwan Kim, Cheju-do Cheju-city 1Do 1Dong 1298-6, Cheju (KR), 690-011

( * ) Notice: Subject to any disclaimer, the term of this patent is extended or adjusted under 35 U.S.C. 154(b) by 0 days.

(21) Appl. No.: 09/419,573

(22) Filed: Oct. 18, 1999

(51) Int. Cl.[7] .................................................. B60H 1/24
(52) U.S. Cl. ........................ 237/12.3 R; 62/244; 454/143
(58) Field of Search ............................. 62/244; 454/143, 454/152; 237/12.3 R, 12.3 A; 219/204

(56) References Cited

U.S. PATENT DOCUMENTS

| | | | | |
|---|---|---|---|---|
| 1,002,754 A | * | 9/1911 | Reichert, Jr. ............ | 237/12.3 R |
| 1,237,231 A | * | 8/1917 | Wilson et al. ......... | 237/12.3 R |
| 1,262,194 A | * | 4/1918 | Hower .................. | 237/12.3 R |
| 1,262,392 A | * | 4/1918 | Saint Clair ............ | 237/12.3 R |
| 1,304,047 A | * | 5/1919 | Hoban ................... | 237/12.3 R |
| 4,562,957 A | * | 1/1986 | Nakagawa et al. .... | 237/12.3 R |
| 5,138,851 A | * | 8/1992 | Mardikian ............... | 62/244 |
| 5,850,741 A | * | 12/1998 | Feher ......................... | 62/3.61 |

* cited by examiner

Primary Examiner—William E. Tapolcai

(57) ABSTRACT

A vehicle steering wheel, which comprises: (a) a main connection hose originated from a pre-existing air conditioning unit; (b) a coupling device connected to the main connection hose; (c) a left connection hose extension extending from the coupling device; (d) a right connection hose extension extending from the coupling device; (e) a plurality of left air vents connected to the left connection hose extension and mounted on a left hand-gripping portion; and (f) a plurality of right air vents connected to the right connection hose extension and mounted on a right hand-gripping portion.

1 Claim, 3 Drawing Sheets

COMFORT STEERING WHEEL

BACKGROUND—Field of the Invention

This invention relates to a process whereby the user of a steering wheel may operate a vehicle comfortably and safely without experiencing hand perspiration, fatigue or other discomfort.

BACKGROUND—Description of Prior Art

The comfort steering wheel is truly a unique invention. By capitalizing on current air conditioning systems prevalent in virtually all vehicles, this system ensures a driver's hands will be cool and dry in the heat of summer, yet warm in the coldest winter conditions.

Previously, vehicle operators were left few viable alternatives to ensure a comfortable and safe driving experience in all seasons and driving conditions. All such alternatives suffer a fatal flaw—over time both their form and function deteriorate to the point of uselessness.

Steering wheel covers, whether vinyl or leather, get dirty, collect moisture, germs and bacteria (and concomitant odors). Eventually they wear out: color fades, material cracks and tears. The cover also loosens over time, increasing the safety risk by limiting a driver's control over the vehicle. Covers also deny the driver the enjoyment of specialty steering wheels made of wood or other such materials.

Driving gloves also get dirty, collect moisture, germs and bacteria (and concomitant odors). Eventually they wear out: color fades, material cracks and tears. Gloves also deny the driver the enjoyment of specialty steering wheels made of wood or other such materials. In the summer, the driver's hands become uncomfortably warm, and perspiration lessens the driver's control. Gloves are easy to forget, and are driver specific, as each person needs his or her own pair.

Handkerchiefs, hand towels (or even a driver's own clothing!) offer little assistance. They serve no purpose in the winter as they do nothing to keep one's hands warm. In the summer they clearly constitute at best a last ditch alternative to a better way. Enter . . . the comfort steering wheel.

OBJECTS AND ADVANTAGES

The comfort steering wheel incorporates existing technology within a unique process whereby a vehicle operator's driving experience is made more pleasurable and safe under all driving conditions.

In summer, the comfort steering wheel affords cool air ventilation which keeps hands dry, cool and comfortable—thereby avoiding driver fatigue, increasing driver control, and ensuring a more pleasant driving experience.

In the winter, the comfort steering wheel provides warm air which keeps hands warm and flexible—again ensuring a comfortable driving experience, avoiding driver fatigue and increasing vehicle control.

The comfort steering wheel employs a straightforward, simple and economical process. Via a basic connection device (as simple as a rubber hose), air is diverted from the vehicle's existing air conditioning system directly to the steering wheel—no outside source is required. The entire mechanism is contained within the interior space of the steering wheel itself—no valuable interior car space is necessary.

The system is flexible—via the air conditioning unit the driver can regulate air flow and temperature—ensuring a driving experience that is comfortably warm in the winter, or pleasantly cool in the heat of summer.

The system is convenient. No need for periodic trips to the auto parts store to replace a worn steering wheel cover or old driving gloves. Unlike driving gloves, one can't forget to bring the comfort steering wheel along. Further—one size fits all.

The system is safe. In the summer, hand perspiration causes the steering wheel to be slippery, adversely affecting driver control. The system provides cool air directly to the driver's hands, ensuring dry palms and steering wheel control. In the winter, driver control is ensured as the system makes cold, rigid hands warm and flexible. This aspect of the system will have a special appeal to sensitive drivers (such as the elderly) who are more sensitive to extreme weather conditions.

The system is simple. Few parts mean a dramatically lessened likelihood of part or system failure. To the driver, this means repairs will be very unlikely, and if necessary, extremely inexpensive.

Further objects and advantages of my invention will become apparent from a consideration of the drawings and ensuing description.

DRAWING FIGURES

REFERENCE NUMERALS IN DRAWINGS

Figure 1:
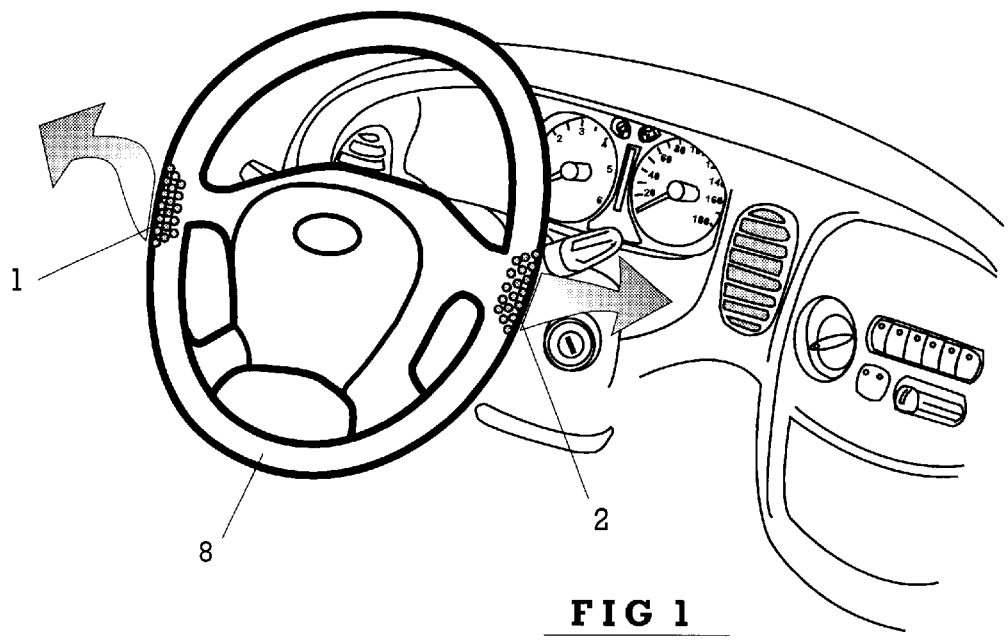
FIG. 1 shows an exterior view of the comfort steering wheel relative to the instrument panel of a vehicle.

1. Left air vents
2. Right air vents
3. Interior reinforcement bar
4. Coupling
5. Main connection hose
6. Left connection hose extension
7. Right connection hose extension
8. Steering wheel handle
9. Steering wheel base

DESCRIPTION OF INVENTION

FIG. 1 shows an exterior view of the comfort steering wheel relative to the instrument panel of a vehicle. Visible are the steering wheel handle 8 as well as the left air vents 1 and right air vents 2.

Figure 2:
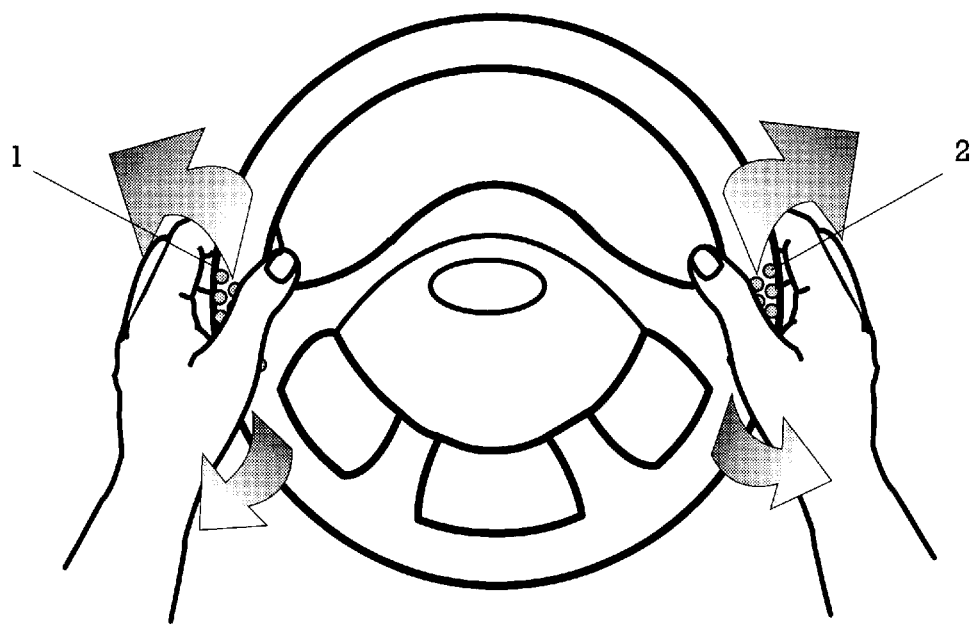
FIG. 2 shows an exterior view of the comfort steering wheel from the driver's perspective, including relative position of the driver's hands.

FIG. 2 shows an exterior view of the comfort steering wheel from the driver's perspective, including relative position of the driver's hands as compared to the left air vents 1 and right air vents 2.

Figure 3:
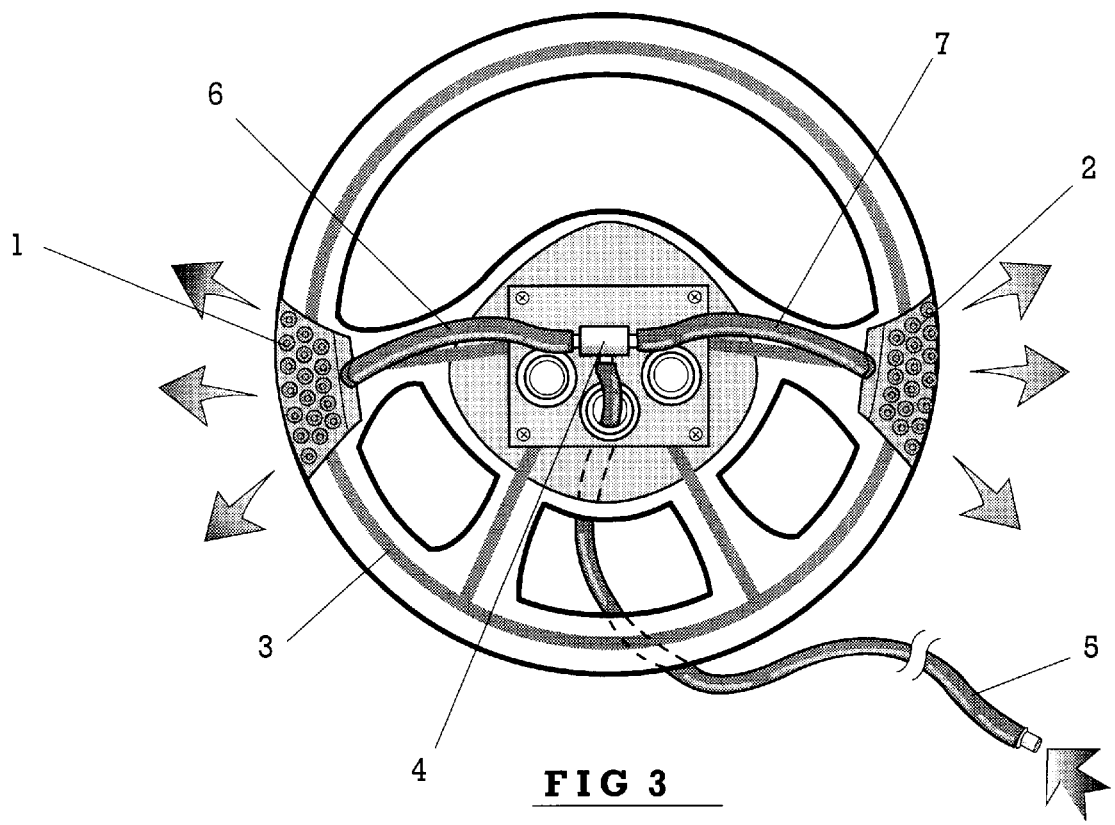
FIG. 3 shows a cross section of the comfort steering wheel from the driver's perspective.

FIG. 3 shows a cross section of the comfort steering wheel from the driver's perspective. Originating from the pre-existing air conditioning unit located within the vehicle dashboard, the main connection hose 5 enters a coupling device 4 where is it divided into two different hoses: a left connection hose extension 6 and right connection hose extension 7. The connection hose extensions attach to left air vents 1 and right air vents 2, respectively.

Figure 4:
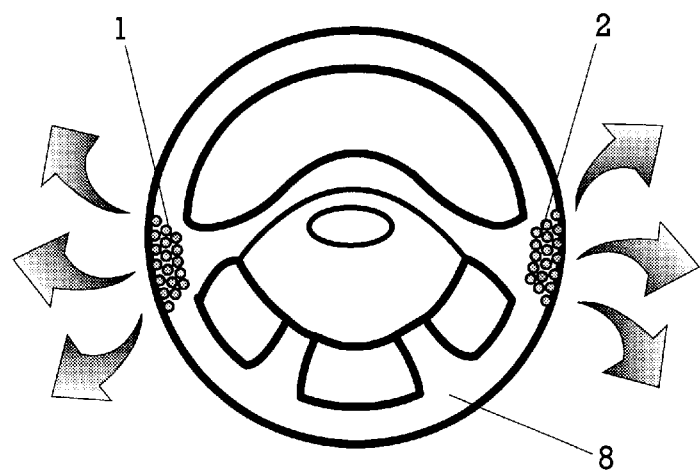
FIG. 4 shows an exterior view of the comfort steering wheel from the driver's perspective.

FIG. 4 clearly shows small holes created in the surface of the steering wheel handle 8 which constitute the left air vents 1 and right air vents 2.

Figure 5:
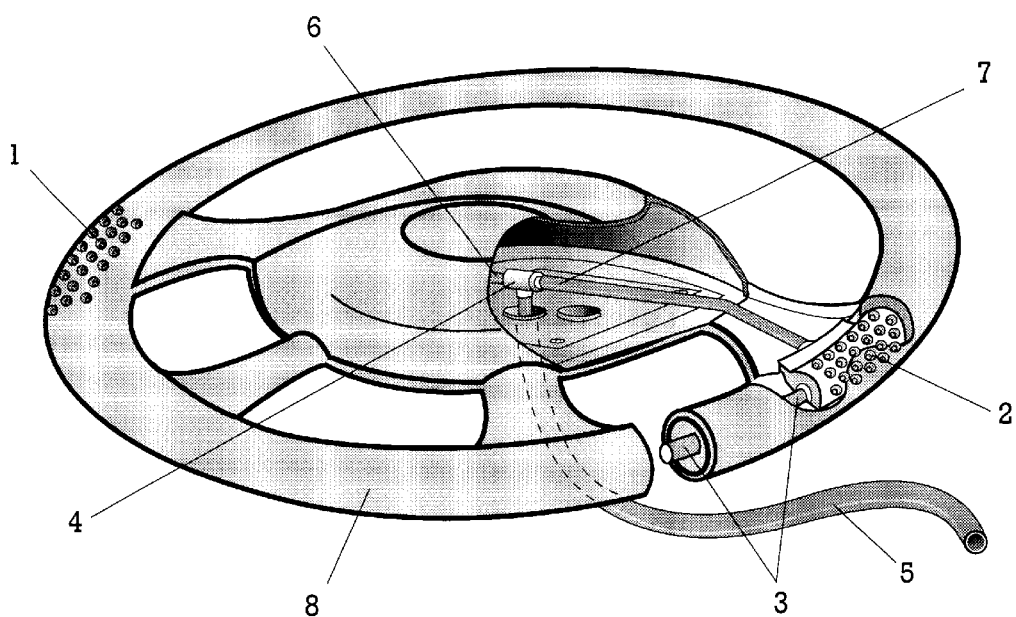
FIG. 5 shows an interior view of the comfort steering wheel mechanism.

FIG. 5 shows an interior view of the comfort steering wheel mechanism. This view shows that the left air vents 1 and right air vents 2 utilize open space between the interior reinforcement bar 3 and the exterior steering wheel handle 8. No cutting or removal of the interior reinforcement bar 3 is required.

Figure 6:
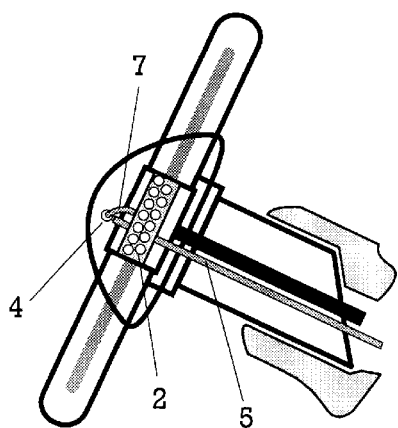
FIG. 6 shows an interior right side view of the comfort steering wheel.

FIG. 6 shows an interior right side view of the comfort steering wheel. This view makes clear that the entire system is contained within the pre-existing steering wheel mechanism. The main connection hose 5 passes through the interior of the steering wheel base 9 and through a coupling device 4 at which point the main connection hose is divided into the right connection hose extension 7.

Figure 7:
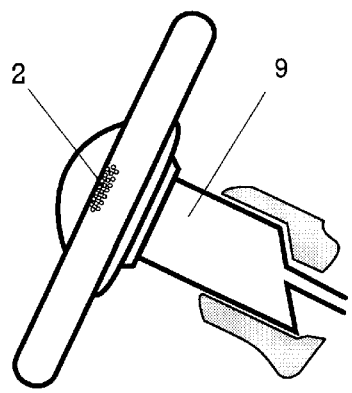
FIG. 7 shows an exterior right side view of the comfort steering wheel.

FIGS. 4 and 7 show exterior views of the comfort steering wheel, and demonstrate that only left air vents 1 and right air vents 2 are visible.

OPERATION OF INVENTION

The comfort steering wheel is a simple invention which employs existing vehicle air conditioning systems to ventilate a driver's hands when applied to a standard steering wheel device.

FIG. 1 shows an exterior view of the comfort steering wheel relative to the instrument panel of a vehicle. Depending upon the driver's preference, warm or cool air is ultimately delivered from the steering wheel handle 8 to the drivers hands via left air vents 1 and right air vents 2. FIG. 2 shows an exterior view of the comfort steering wheel from the driver's perspective, including relative position of the driver's hands as compared to the left air vents 1 and right air vents 2.

FIG. 3 shows a cross section of the comfort steering wheel from the driver's perspective. Warm or cool air is diverted from the main air conditioning system unit located in the vehicle instrument panel via a main connection hose 5. The main connection hose enters a coupling device 4 where is it divided into two different hoses: a left connection hose extension 6 and right connection hose extension 7. Air exits the connection hose extensions via left air vents 1 and right air vents 2 via small holes created in the surface of the steering wheel handle 8.

FIG. 5 shows an interior view of the comfort steering wheel mechanism. This view shows that the left air vents 1 and right air vents 2 utilize open space between the interior reinforcement bar 3 and the exterior steering wheel handle 8. No cutting or removal of the interior reinforcement bar 3 is required.

FIG. 6 shows an interior side view of the comfort steering wheel. This view makes clear that the entire system is contained within the pre-existing steering wheel mechanism. The main connection hose 5 passes through the interior of the steering wheel base 9. Via a coupling device 4 air passes through the right connection hose extension 7 and ultimately exits the contained unit via the right air vents 2.

CONCLUSIONS, RAMIFICATIONS AND SCOPE

The comfort steering wheel offers a simple and inexpensive, yet unique, process to enhance driver comfort and safety under all weather conditions.

The system is simple, with minimal parts and connections. Via a basic connection device (as simple as a rubber hose), air is diverted from the vehicle's existing air conditioning system directly to the steering wheel. No outside source is required. Accordingly, malfunctions or breakdowns requiring repairs will be unlikely, and if necessary, inexpensive.

The system is flexible—via the air conditioning unit the driver can regulate air flow and temperature—ensuring a driving experience that is comfortably warm in the winter, or pleasantly cool in the heat of summer.

The system is safe. In the summer, hand perspiration will be avoided, ensuring driver control. In the winter, driver control is achieved as the system makes cold, rigid hands warm and flexible.

The system is convenient. One size fits all, and the entire mechanism is contained within the interior space of the steering wheel itself—no valuable interior car space is necessary.

Although the above description contains many specificities, these should not be construed as limiting the scope of my invention but merely as providing illustrations of one of the presently preferred embodiments. The scope of the invention should be determined by the appended claim (s) and legal equivalent(s).

I claim:

1. A vehicle steering wheel, which comprises:
    (a) a main connection hose originated from a pre-existing air conditioning unit;
    (b) a coupling device connected to the main connection hose;
    (c) a left connection hose extension extending from the coupling device;
    (d) a right connection hose extension extending from the coupling device;
    (e) a plurality of left air vents connected to the left connection hose extension and restrictedly mounted on a left hand-gripping portion; and
    (f) a plurality of right air vents connected to the right connection hose extension and restrictedly mounted on a right hand-gripping portion,
wherein the air vents utilize open space between an interior reinforcement bar of the wheel and an exterior steering wheel handle whereby cold or warm air diverted from the pre-existing air conditioning unit may be contacted directly to palms of a driver's hands.

* * * * *